(12) United States Patent
Lin et al.

(10) Patent No.: US 10,220,395 B2
(45) Date of Patent: Mar. 5, 2019

(54) WATER STOP DEVICE AND SHOWER HEAD

(71) Applicant: XIAMEN SOLEX HIGH-TECH INDUSTRIES CO., LTD., Xiamen, Fujian (CN)

(72) Inventors: Fengde Lin, Fujian (CN); Hailang Gong, Fujian (CN); Mingfu Zhang, Fujian (CN); Wenxing Chen, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 139 days.

(21) Appl. No.: 15/379,095

(22) Filed: Dec. 14, 2016

(65) Prior Publication Data

US 2018/0050353 A1 Feb. 22, 2018

(30) Foreign Application Priority Data

Aug. 18, 2016 (CN) .......................... 2016 1 0685981

(51) Int. Cl.
  *B05B 1/30* (2006.01)
  *B05B 1/18* (2006.01)
  *B05B 12/00* (2018.01)

(52) U.S. Cl.
  CPC .............. *B05B 1/3026* (2013.01); *B05B 1/18* (2013.01); *B05B 12/002* (2013.01)

(58) Field of Classification Search
  CPC ...... F16K 31/523; F16K 27/041; F16K 31/60; B05B 1/1609; B05B 1/1672; B05B 12/002; B05B 1/3026; B05B 1/18
  See application file for complete search history.

(56) References Cited

U.S. PATENT DOCUMENTS

| 8,152,078 B2 * | 4/2012 | Jianglin | B05B 1/1618 137/862 |
| 8,424,781 B2 * | 4/2013 | Rosko | B05B 1/1609 239/446 |
| 8,727,241 B2 * | 5/2014 | Bosio | B05B 1/1618 239/525 |
| 9,470,334 B2 * | 10/2016 | Zhou | F16K 31/44 |

(Continued)

FOREIGN PATENT DOCUMENTS

EP         2561930 A1 *  2/2013  ............. B05B 1/304

*Primary Examiner* — Marina Tietjen
(74) *Attorney, Agent, or Firm* — Rabin & Berdo, P.C.

(57) ABSTRACT

The present invention is provided with a water stop device, wherein comprising: a main body, a transmitting element and a sealing element; the main body is disposed with an inlet passage, a diversion passage and a confluence passage in the axial direction in order; the diversion passage is connected to the confluence passage by a normal-open hole; one end of the sealing element is coupled to the transmitting element in transmitting way, such that the sealing element moves between a first position and a second position along the axial direction of the confluence passage; the diversion passage is connected to the confluence passage when the sealing element is situated in the first position; the sealing element closes the confluence passage when the sealing element is situated in the second position. The present invention can occupy small space such to decrease the diameter of the inlet pipe efficiently.

7 Claims, 6 Drawing Sheets

(56) References Cited

U.S. PATENT DOCUMENTS

| | | | |
|---|---|---|---|
| 9,708,800 B2 * | 7/2017 | Bosio | E03C 1/0404 |
| 9,770,726 B2 * | 9/2017 | Zhou | B05B 1/3013 |
| 9,828,750 B2 * | 11/2017 | Hu | E03C 1/0408 |
| 2004/0112985 A1 * | 6/2004 | Malek | B05B 1/1618 |
| | | | 239/445 |
| 2008/0067264 A1 * | 3/2008 | Erickson | B05B 1/1618 |
| | | | 239/445 |
| 2013/0161549 A1 * | 6/2013 | Zhou | B05B 1/18 |
| | | | 251/213 |
| 2014/0076993 A1 * | 3/2014 | Zhou | B05B 1/3013 |
| | | | 239/75 |
| 2016/0305099 A1 * | 10/2016 | Hu | E03C 1/0408 |

* cited by examiner

WATER STOP DEVICE AND SHOWER HEAD

FIELD OF THE INVENTION

The present invention relates to a water stop device.

BACKGROUND OF THE INVENTION

A shower head needs to turn off temporally when the user wants to apply shower gel or shampoo. Traditional shower head can only switch to open or close the water by the outlet switch, which is inconvenient. There is a shower head with the main body disposed with a water stop switch button in recent market; when the button is pressed, the shower head can realize temporal water stop. But due to the structure design problem, the water stop device occupies large space, so that the diameter of the inlet pipe at the end of the shower head is large, making the shower head not esthetical enough.

SUMMARY OF THE INVENTION

The main technical solution of the present invention is to provide with a water stop device, which can occupy small space such to decrease the diameter of the inlet pipe efficiently.

The technical solution of the present invention is that:

A water stop device, wherein comprising: a main body, a transmitting element and a sealing element;

the main body is disposed with an inlet passage, a diversion passage and a confluence passage in the axial direction in order; the diversion passage is connected to the confluence passage by a normal-open hole;

one end of the sealing element is coupled to the transmitting element in transmitting way, such that the sealing element moves between a first position and a second position along the axial direction of the confluence passage; the diversion passage is connected to the confluence passage when the sealing element is situated in the first position; the sealing element closes the confluence passage when the sealing element is situated in the second position.

In another preferred embodiment, the main body is disposed with a chamber in the inlet passage, one end of the chamber is an opening end configured to be faced to confluence passage along the axial direction of the main body; water flows out of the inlet passage and impacts the bottom end of the external wall of the chamber then divides to the diversion passage at the side of the chamber.

In another preferred embodiment, the external periphery of the sealing element is disposed with a first sealing ring, when the sealing element switches between the first position and the second position in the axial direction of the confluence passage, the first sealing element always contacts with the side wall of the chamber in sealing way.

In another preferred embodiment, the external periphery of one end of the sealing element is disposed with a second sealing ring coaxial to the first sealing ring, the first sealing ring and the second sealing ring are equal in size; when the sealing element is situated in the second position, the second sealing ring contacts with the side wall of the confluence passage in sealing way; when the sealing element is situated in the first position, the second sealing ring separates from the side wall of the confluence passage.

In another preferred embodiment, the transmitting element is a push rod disposed in the axial direction of the main body, the end of the push rod is connected to the sealing element; the external periphery of one end of the sealing element connected to the push rod is further disposed with a third sealing ring coaxial to the first sealing ring, the first sealing ring and the third sealing ring are equal in size; the third sealing ring always contacts with the side wall of the confluence passage in sealing way.

In another preferred embodiment, the side wall of the confluence passage is disposed with an outlet, the outlet is disposed between the second sealing ring and the third sealing ring.

In another preferred embodiment, the front end of the push rod is disposed with a lock ring, the lock ring is linked to an activating element, when the activating element is operated, the push rod drives the sealing element to move in the axial direction of the main body.

In another preferred embodiment, the activating element is a push button or a rocker switch.

In another preferred embodiment, the chamber is disposed with an air exhausting hole to connect the chamber and the outside air.

The present invention is further provided with a shower head, which is assembled with the water stop device above mentioned.

Compared to the traditional technology, the technical solution of the present invention has following advantages:

The present invention is provided with a water stop device that the sealing element and the chamber are disposed in the axial direction of the main body, so that the water divides and converges in the axial direction; the sealing element moves in the axial direction of the main body to open and close the confluence passage to realize the switch of water stop and water supplying; as the motions of the sealing element are in the axial direction, it requires lower to the pipe diameter of the inlet pipe, the diameter of the inlet pipe needn't to increase due to the water stop device.

On the other hand, as the first sealing ring is coaxial to the third sealing ring, and they are equal in size, when the confluence passage is open, the first sealing ring and the third sealing ring are subjected to water pressure force in the confluence passage at the same time. Two acting forces are equal in power and opposite in direction, such that they exactly neutralize each other. Therefore, water pressure doesn't influence the sealing element during the switching from water supplying state to water stop state.

When the confluence passage is closed, water blocked in the diversion passage applied on the first sealing ring and the second sealing with forces of equal power and opposite direction, they exactly neutralize each other. Therefore, the needed switch force is very small to make the water stop device switched form the water stop state to the water supplying state. During the switching, the sealing element moves to the right along the chamber; air in the chamber exhausts out through the air exhaust hole, preventing switching failure due to increased air pressure when the chamber is compressed. The needed switch force is very small to switch the water stop device, and the switch hand feeling is well.

DETAIL DESCRIPTION OF THE EMBODIMENTS

Figure 1:
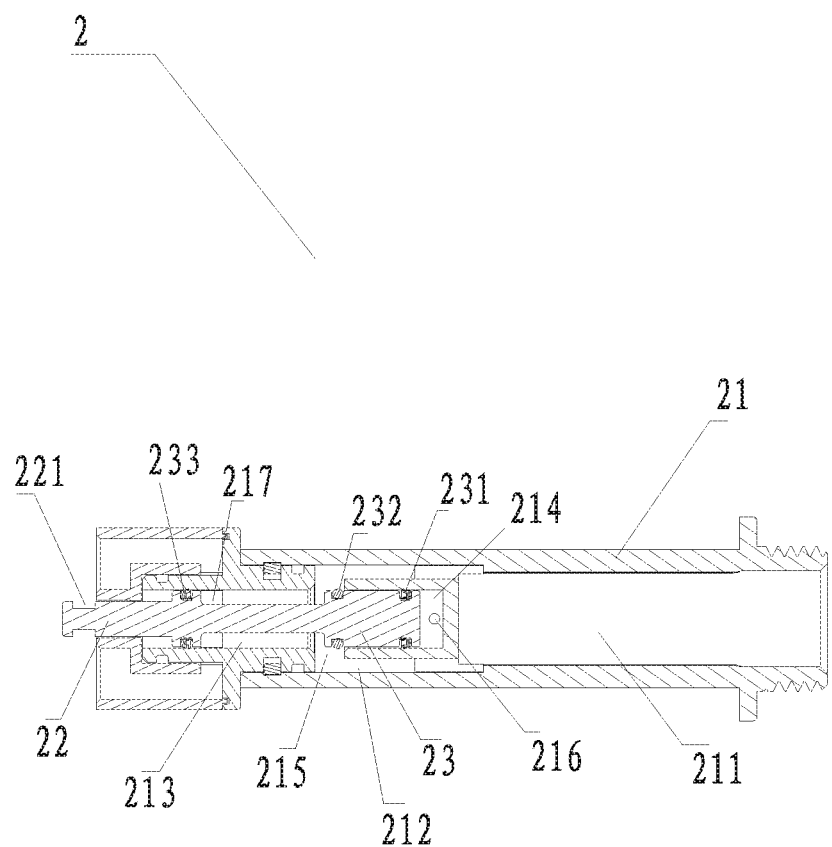
FIG. 1 illustrates a schematic diagram of a water stop device of Embodiment 1 of the present invention in water supplying state.
Figure 2:
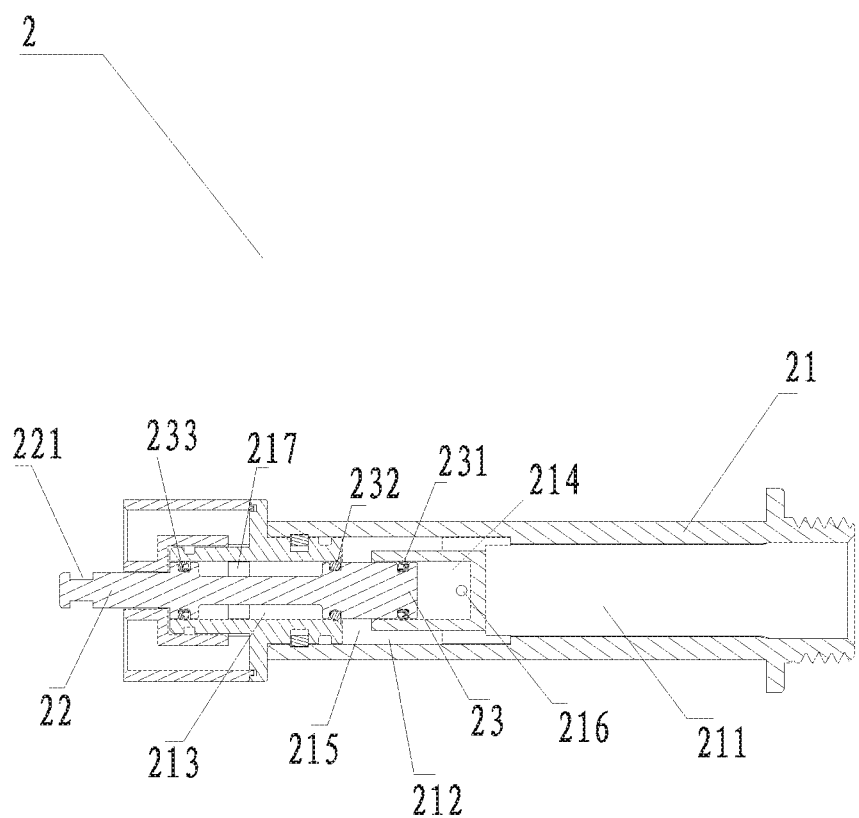
FIG. 2 illustrates a schematic diagram of the water stop device of Embodiment of the present invention in water stop state.
Figure 3:
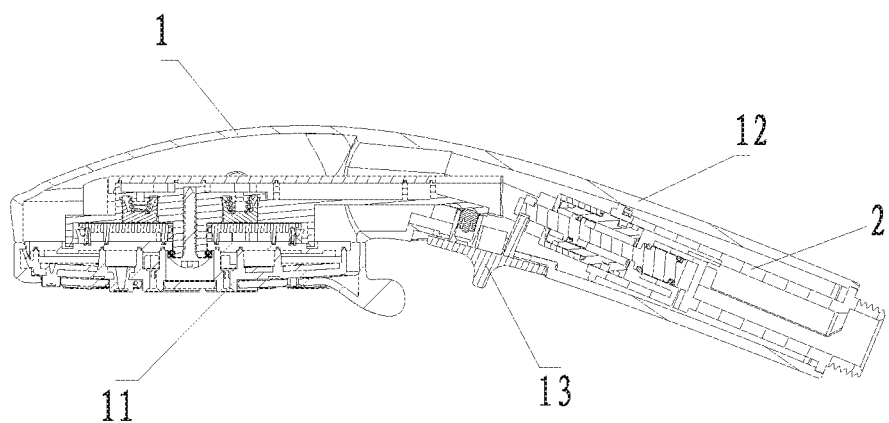
FIG. 3 illustrates a sectional diagram of a shower head of Embodiment 1 of the present invention in water supplying state.
Figure 4:
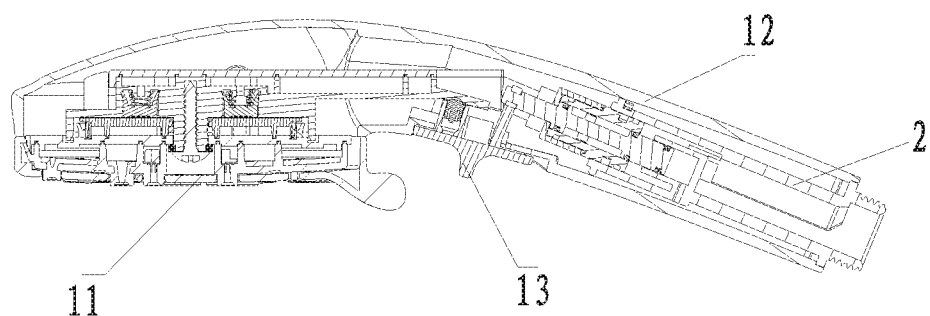
FIG. 4 illustrates a sectional diagram of the shower head of Embodiment 1 of the present invention in water stop state.

The present invention will be further described with the drawings and the embodiments.

Embodiment 1

Referring to FIGS. 1-4, this embodiment is provided with a shower head, which comprises a shower head main body 1 and a water stop device 2.

The shower head main body 1 comprises an outlet cover plate 11 and an inlet pipe 12; the water stop device 2 is disposed in the inlet pipe 12. The water stop device 2 comprises a main body 21, a transmitting element 22 and a sealing element 23.

The main body 21 is disposed with an inlet passage 211, a confluence passage 213 and a chamber 214 in the axial direction in order; one end of the chamber 214 is an opening end; the opening end is configured to be faced to confluence passage 213 along the axial direction of the main body 21; water flows out of the inlet passage 211 and impacts the bottom end of the external wall of the chamber 214 then divides to two sides of the external wall of the chamber 214, therefore, a diversion passage 212 is formed at two sides of the chamber 214. The inlet passage 211, the diversion passage 212, the confluence passage 213 are arranged in the axial direction of the main body 21, and the diversion passage 212 is connected to the confluence passage 213 by a normal-open hole 215.

One end of the sealing element 23 is coupled to the transmitting element 22 in transmitting way, such that the sealing element 23 moves between a first position and a second position along the axial direction of the confluence passage 213; the external periphery of the sealing element 23 is disposed with a first sealing ring 231, when the sealing element 23 switches between the first position and the second position in the axial direction of the confluence passage 213, the first sealing element 231 always contacts with the side wall of the chamber 214 in sealing way. The chamber 214 is disposed with an air exhausting hole 216 to connect the chamber 214 and the outside air.

The external periphery of the sealing element 23 is disposed with a second sealing ring 232 coaxial to the first sealing ring 231, the first sealing ring 231 and the second sealing ring 232 are equal in size; when the sealing element 23 is situated in the second position, the second sealing ring 232 contacts with the side wall of the confluence passage 213 in sealing way; when the sealing element 23 is situated in the first position, the second sealing ring 232 separates from the side wall of the confluence passage 213. Therefore, water stop function and water supplying function are switched. As the sealing element 23 moves in the axial direction of the main body 21 so as to open and close the confluence passage 213 to achieve the switch of water stop and water supplying, compared to traditional sealing element moving in a direction vertical to the axis, this embodiment requires lower to the pipe diameter of the inlet pipe 12, the diameter of the inlet pipe 12 needn't to increase due to the water stop device 2.

In this embodiment, the transmitting element 22 is a push rod disposed in the axial direction of the main body 21, the end of the push rod is connected to the sealing element 23; the external periphery of one end of the sealing element 23 connected to the push rod is further disposed with a third sealing ring 233 coaxial to the first sealing ring 231, the first sealing ring 231 and the third sealing ring 233 are equal in size; the third sealing ring 233 always contacts with the side wall of the confluence passage 213 in sealing way.

The side wall of the confluence passage 231 is disposed with an outlet 217, which is disposed between the second sealing ring 232 and the third sealing ring 233.

As the first sealing ring 231 is coaxial to the third sealing ring 233, and they are equal in size, when the confluence passage 213 is open, the first sealing ring 231 and the third sealing ring 233 are subjected to water pressure force in the confluence passage 213 at the same time. Two acting forces are equal in power and opposite in direction, such that they exactly neutralize each other. Therefore, water pressure doesn't influence the sealing element during the switching from water supplying state to water stop state.

When the confluence passage 213 is closed, water blocked in the diversion passage 212 applied on the first sealing ring 231 and the second sealing 232 with forces of equal power and opposite direction, they exactly neutralize each other. Therefore, the needed switch force is very small to make the water stop device switched form the water stop state to the water supplying state.

During the switching, the sealing element 23 moves to the right along the chamber 214; air in the chamber 214 exhausts out through the air exhaust hole 216, preventing switching failure due to increased air pressure when the chamber 214 is compressed. The needed switch force is very small to switch the water stop device 2, and the switch hand feeling is well.

The front end of the push rod is disposed with a lock ring 221, which is linked to an activating element 13, in this embodiment, the activating element 13 is a push button disposed at the front end of the inlet pipe 12, the push button is locked to the lock ring 221, therefore, when the push button is pushed, it drives the push rod to move in the axial direction of the main body 21 so as to drive the sealing element 23 to move in the same direction.

Embodiment 2

Figure 5:
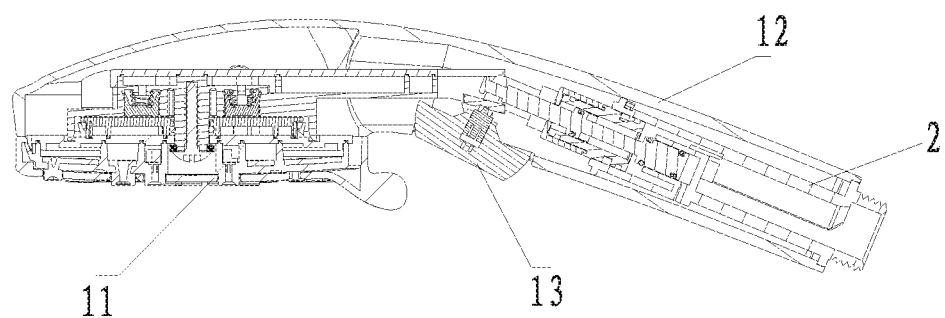
FIG. 5 illustrates a sectional diagram of a shower head of Embodiment 2 of the present invention in water supplying state.
Figure 6:
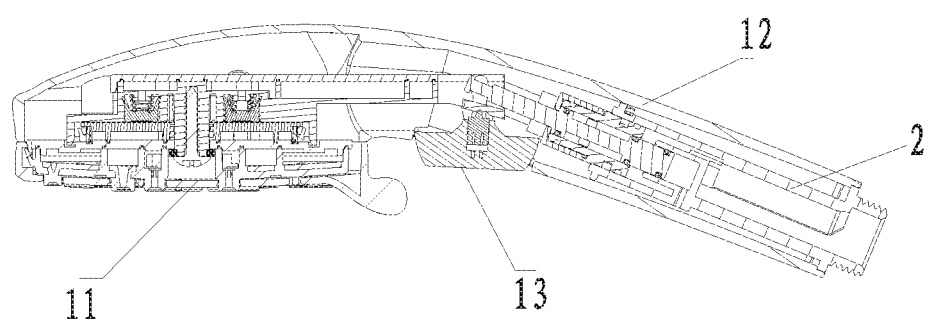
FIG. 6 illustrates a sectional diagram of the shower head of Embodiment 2 of the present invention in water stop state.

Referring to FIGS. 5-6, this embodiment differs from Embodiment 1 from that: the activating element 13 is a rocker switch, the other portion of this embodiment is similar to Embodiment 1. Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A water stop device, comprising:
a main body, a transmitting element and a sealing element;
the main body having, in the following order in an axial direction, an inlet passage, a diversion passage and a confluence passage;
wherein the diversion passage is connected to the confluence passage by a normally-open hole;

one end of the sealing element is coupled to the transmitting element in a transmitting way, such that the sealing element moves between a first position and a second position along the confluence passage in the axial direction;

the diversion passage is connected to the confluence passage when the sealing element is situated in the first position;

the sealing element closes the confluence passage when the sealing element is situated in the second position;

the main body has a chamber in the inlet passage;

one end of the chamber is an opening end configured to face the confluence passage along the axial direction;

water flowing in the inlet passage impacts a bottom wall of an external wall of the chamber and then divides in the diversion passage at sides of the chamber;

an external periphery of the sealing element has a first sealing ring; and when the sealing element switches between the first position and the second position in the axial direction, the first sealing ring always contacts a side wall of the chamber in a sealing way;

an external periphery of the one end of the sealing element has a second sealing ring coaxial with the first sealing ring, the first sealing ring and the second sealing ring are equal in size;

when the sealing element is situated in the second position, the second sealing ring contacts a side wall of the confluence passage in a sealing way; and when the sealing element is situated in the first position, the second sealing ring separates from the side wall of the confluence passage.

2. The water stop device according to claim 1, wherein the transmitting element is a push rod disposed in the axial direction, an end of the push rod is connected to the sealing element, the external periphery of the one end of the sealing element is connected to the push rod, a third sealing ring is coaxial with the first sealing ring, the first sealing ring and the third sealing ring are equal in size, and the third sealing ring always contacts the side wall of the confluence passage in a sealing way.

3. The water stop device according to claim 2, wherein the side wall of the confluence passage has an outlet disposed between the second sealing ring and the third sealing ring.

4. The water stop device according to claim 2, wherein a front end of the push rod has a lock ring, the lock ring is linked to an activating element, and when the activating element is operated, the push rod drives the sealing element to move in the axial direction.

5. The water stop device according to claim 4, wherein the activating element is a push button or a rocker switch.

6. The water stop device according to claim 1, wherein the chamber has an air exhausting hole to connect the chamber and outside air.

7. A shower head including the water stop device according to claim 6.

* * * * *